United States Patent [19]

Suzuki et al.

[11] Patent Number: 4,694,294
[45] Date of Patent: Sep. 15, 1987

[54] SYNCHRONIZED NETWORK SYSTEM

[75] Inventors: Tadashi Suzuki, Yokohama; Toru Futami; Atsushi Sakagami, both of Yokosuka, all of Japan

[73] Assignee: Nissan Motor Company, Limited, Japan

[21] Appl. No.: 753,595

[22] Filed: Jul. 10, 1985

[30] Foreign Application Priority Data

Jul. 12, 1984 [JP] Japan ............................. 59-144812

[51] Int. Cl.⁴ .............................................. H04Q 9/00
[52] U.S. Cl. ............................ 340/825.14; 340/825.2; 375/117
[58] Field of Search ............. 340/825.06, 825.5, 825.2, 340/825.21, 825.14, 825.07, 825.08; 370/82, 83, 95, 91, 92; 375/113, 117

[56] References Cited

U.S. PATENT DOCUMENTS

| | | | |
|---|---|---|---|
| 3,938,144 | 2/1976 | Pederson et al. | 375/117 |
| 4,205,200 | 5/1980 | Parikh et al. | 370/83 |
| 4,227,178 | 10/1980 | Gergaud et al. | 370/91 |

FOREIGN PATENT DOCUMENTS 2837214  3/1986  Fed. Rep. of Germany .
52-13367  4/1977  Japan .

OTHER PUBLICATIONS

Serial System Bus Transfers 3.2 Mbits/s, Curtis Panosuk, Electronic Design, Mar. 22, 1984, pp. 41; 42.

Primary Examiner—Donald J. Yusko
Attorney, Agent, or Firm—Lowe, Price, LeBlanc, Becker & Shur

[57] ABSTRACT

A network system including a data transmission line through which a serial data is transmitted, a synchronous signal line through which a synchronous signal transmission for controlling a transfer of the serial data is transmitted, and a plurality of data stations connected to both the signal transmission line and synchronous signal transmission line, each one of the data stations transferring the serial data to any of the other data stations in accordance with the synchronous signal, wherein a period over which the serial data is transmitted to the data signal transmission line is varied according to a length of the serial data.

11 Claims, 26 Drawing Figures

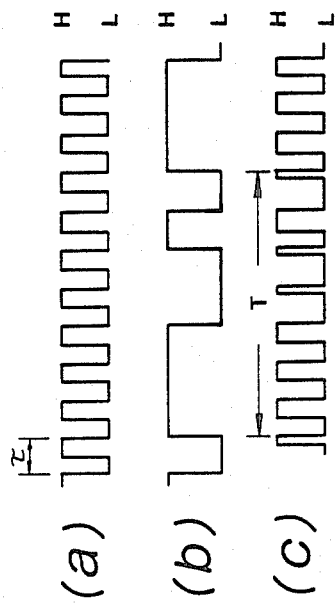
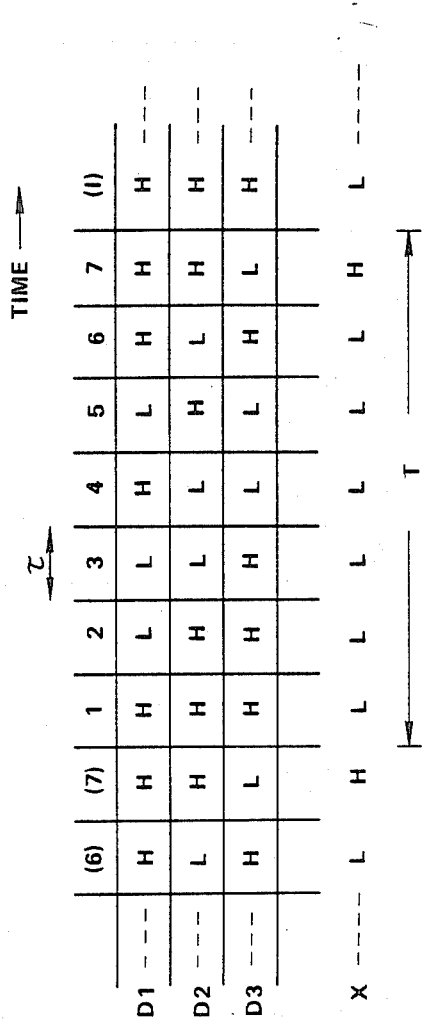
FIG.2 (PRIOR ART)
FIG.3 (PRIOR ART)

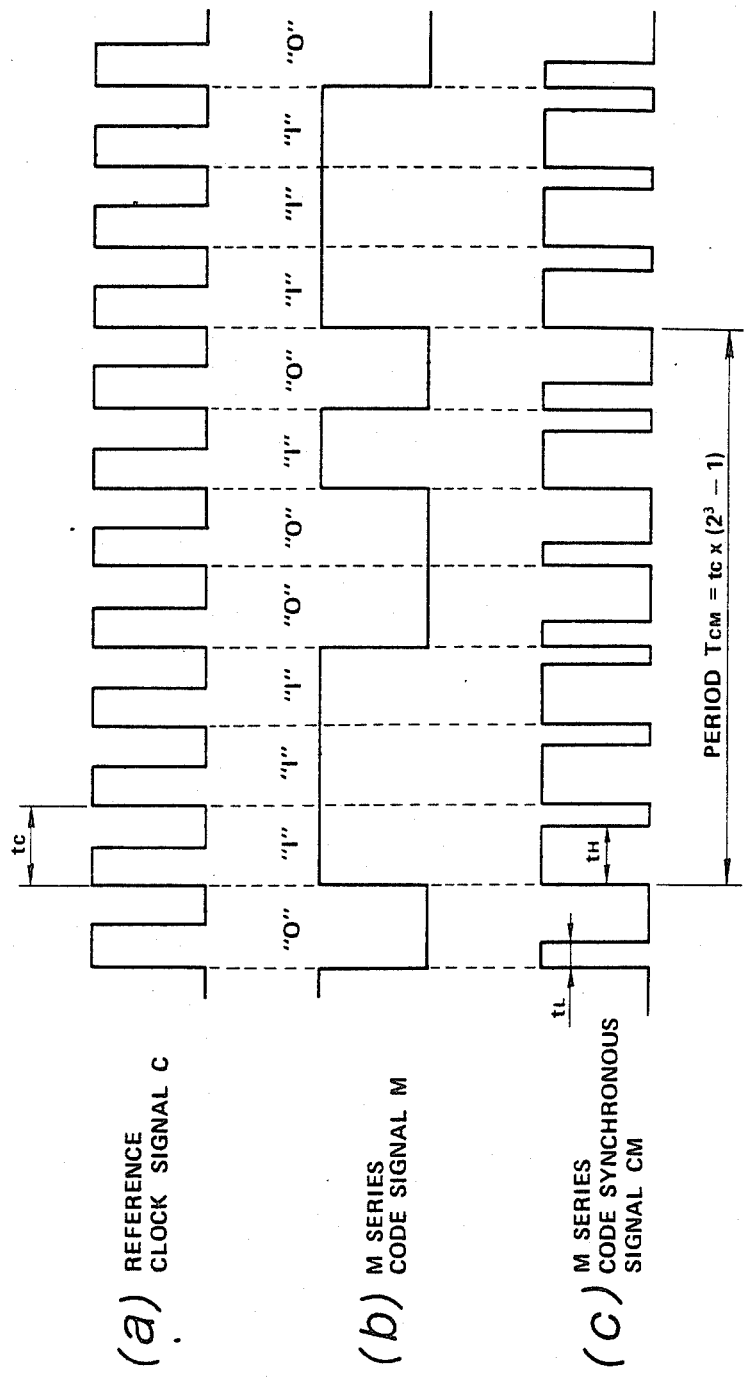

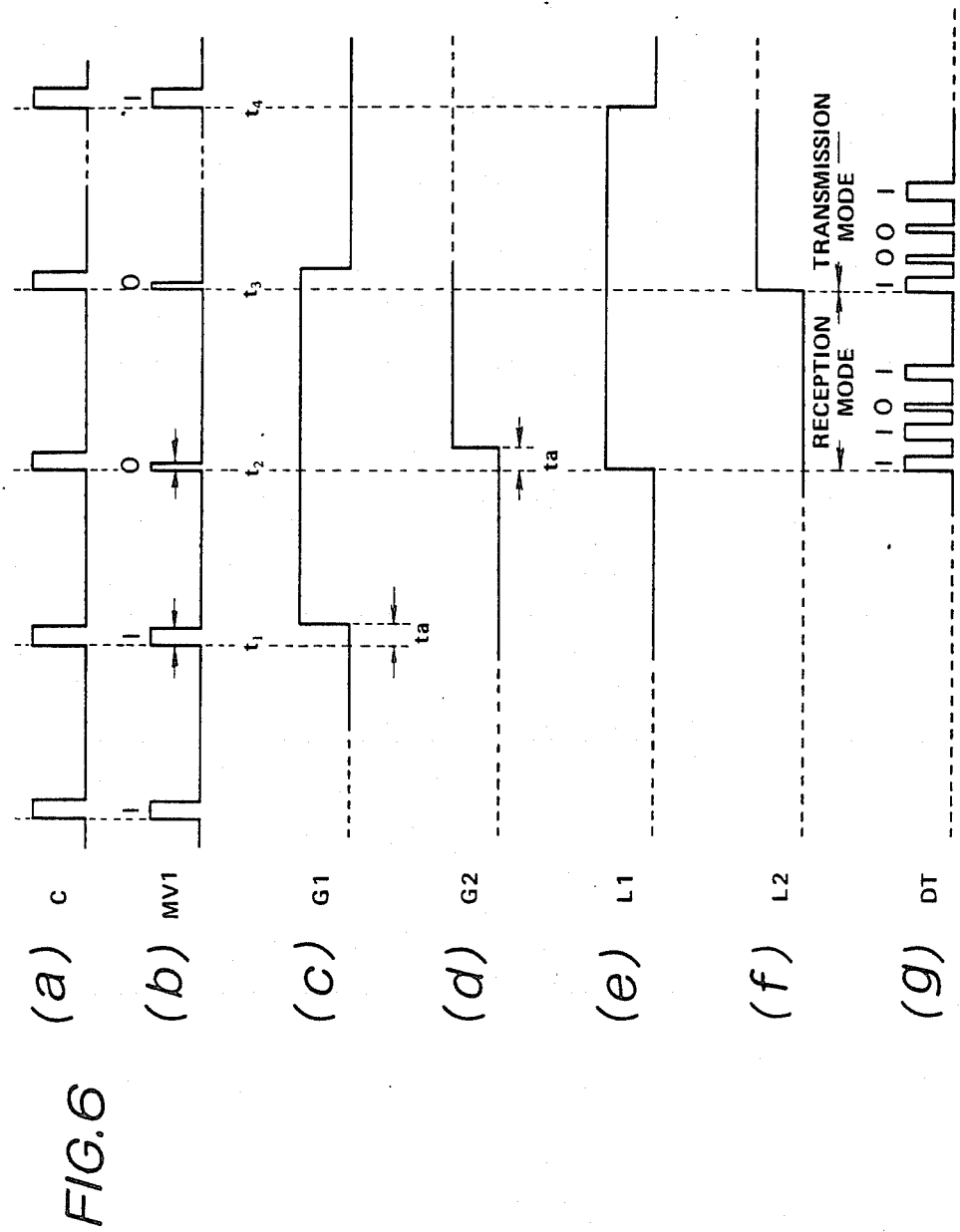

SYNCHRONIZED NETWORK SYSTEM

BACKGROUND OF THE INVENTION

1. Field of the Invention

The present invention relates to a network system wherein a plurality of data stations connected to each other via two signal lines are provided so that the data transfer is mutually carried out between the respective data stations, and more particularly relates to the network system so constructed that a predetermined code string signal is supplied to each station via a synchronous signal line and a serial data on another data signal line is transferred to one of the other stations with a destination addressing to each station and transfer synchronization of data taken.

2. Description of the Prior Art

Two-wire network systems in which data strings and address signals are transmitted via their respective transmission lines have conventionally been proposed. In such systems, a predetermined code string signal is supplied via a synchronous signal transmission line to each station so as to provide addressing and synchronization (transmission control). This is exemplified by Japanese Patent Application Examined Open No. Sho. 52-13,367 titled to a system of signal multiplex transmission published on Apr. 14, 1977.

FIG. 1 shows one pair of transmission and reception stations 604, 605 disclosed in the above-identified document.

As shown in FIG. 1, a plurality of pairs of reception and transmission station 604 and 605 connected via a synchronous signal transmission line 602 and data transmission line 603. A synchronous signal transmission line 602 provides means for transmitting a synchronous signal as shown in FIG. 2(c) to each station from a synchronous signal generator 601.

The synchronous signal generator 601 generates an M series string code repeating such an order of "H", "H", "H", "L", "L", "H", and "L" at a regular interval T, as shown in FIG. 2(b), together with a clock signal having a constant interval τ, as shown in FIG. 2(a), thus outputting the synchronous signal as shown in FIG. 2(c) after a pulsewidth modulation is performed.

The transmission station 604 comprises: (a) a reception circuit (REC.) 606 which receives the synchronous signal and demodulates it into the clock signal and series code signal as shown in FIGS. 2(a) and 2(c); (b) shift registers (S.R.) 607, 608, and 609 which supply sequentially the demodulated series code signal in synchronization with the clock signal; and (c) a logic circuit (LOG.) 610 which enables a gate 611 to open when a logic operation is carried out for mutual output signals of the three shift registers 607, 608, and 609 and the logic operation results in a predetermined logic output.

FIG. 3 shows the relationship between the output levels D1, D2, and D3 of the three shift registers 607, 608, and 609 shown in FIG. 1 and output signal X of the logic circuit 610 with respect to each period of the serially outputted clock signal shown in FIG. 2(a).

Seven kinds of combination patterns of the output logic signal levels L and H of the three shift registers 607, 608, and 609 appear over a period T of the code series signal, as shown in FIG. 3.

Hence, if one of the seven combination patterns in each transmission station 604 is a condition for establishing the logic operation result in the logic circuit 610 (for example, "H", "H", "L", as shown in FIG. 3, the gate 611 is opened when the logic of the logic circuit 610 is established once for the interval T of the series code signal. Consequently, one bit of data is sent to the data transmission line 603 from an output circuit 612 via the opened gate 111.

The reception station 605, on the other hand, comprises: (a) a reception circuit 613; (b) shift registers (S.R.) 614, 615, and 616; and (c) a logic circuit 617, these circuits being interconnected in the same way as the transmission station 604. A gate 618 is opened to connect the signal line 603 to an input circuit 619 only when the predetermined combination pattern is derived over the interval T of the series coded signal so that one bit of data is retrieved from the data transmission line 603 to the input circuit 619.

In this way, data transfer is established via the data transmission line 603 between a transmission station 604 having the logic circuit 610 which enables the gate 611 to open when a predetermined logic condition is established and a reception station 605 having the logic circuit 617 which enables the gate 618 to open when the same logic condition as the logic circuit 610 is established. In addition, the data can be transferred without mutual collision of data with a different synchronization taken for such transmission and reception stations having other predetermined patterns of logic conditions.

However, the conventional network system disclosed in the above-identified document has drawbacks as described below.

Since a time slot (a time corresponding to one clock period τ in the above example) for which a serial data string is transferred is fixed at a constant length of time, the time slot whose width in time is varied according to a length of data in the time slot cannot be set, thus a transmission speed of bit data needs to be increased in the time slot if a data length to be transmitted is long.

Therefore, the transmission efficiency is reduced in such a conventional network system and the network system becomes expensive if the high speed transmission of bit data is carried out.

In addition, a high-frequency noise radiation due to the high speed transmission of data causes the performance of an equipment used in such a conventional network system to be deteriorated. This results in a more expensive network system in order to reduce such a noise radiation.

SUMMARY OF THE INVENTION

With the above-described drawbacks in mind, it is an object of the present invention to provide a network system wherein the time slot for which the serial data string is transferred to a reception station is flexed so that the transmission efficiency is retained and the whole network system is inexpensive.

This can be achieved by providing a network system including a data signal line through which a serial data is transmitted, a control signal line through which a control signal for controlling a synchronous transfer of the serial data is transmitted, and a plurality of data stations connected to both data signal line and control signal line, each one of the data stations transferring the serial data to any of the other data stations in accordance with the control signal, comprising (a) first means for generating and outputting the control signal to the control signal line, the control signal having information bits of a constant period for selecting any of the data stations between which the serial data is transferred via the signal line and with which the transfer of the serial data is synchronized. (b) second means for cyclincally generating the information bits of the control signal, (c) third means for operatively inhibiting the transmission of the information bits to the control signal line, and (d) fourth means responsive to the selection of any of the stations to transmit the serial data to the data signal line by means of the information bits for actuating the third means to inhibit the transmission of the information bits to the control signal line over a period which is varied according to a length of the serial data transmitted to the data signal line.

BRIEF DESCRIPTION OF THE DRAWINGS

A more complete understanding of the present invention may be obtained from the following description taken in conjunction with the attached drawings in which like reference numerals designate corresponding elements and in which:

FIGS. 2(a), 2(b), and 2(c) are signal timing charts for explaining an operation obtaining an M series code synchronous signal in the conventional network system shown in FIG. 1.

FIG. 3 is a logic state diagram for explaining the logic state of the M series code synchronous signal used for the network system shown in FIG. 1.

FIGS. 5(a) through 5(c) are signal timing charts for explaining an operation of the synchronous code generator in the first preferred embodiment shown in FIGS. 4(a) and 4(b);

FIGS. 6(a) through 6(g) are signal timing charts for explaining a whole explanation of the synchronous code generator and the station shown in FIGS. (a) and 4(b);

DETAILED DESCRIPTION OF THE PREFERRED EMBODIMENTS

Reference will hereinafter be made to the drawings in order to facilitate understanding of the present invention.

Figure 1:
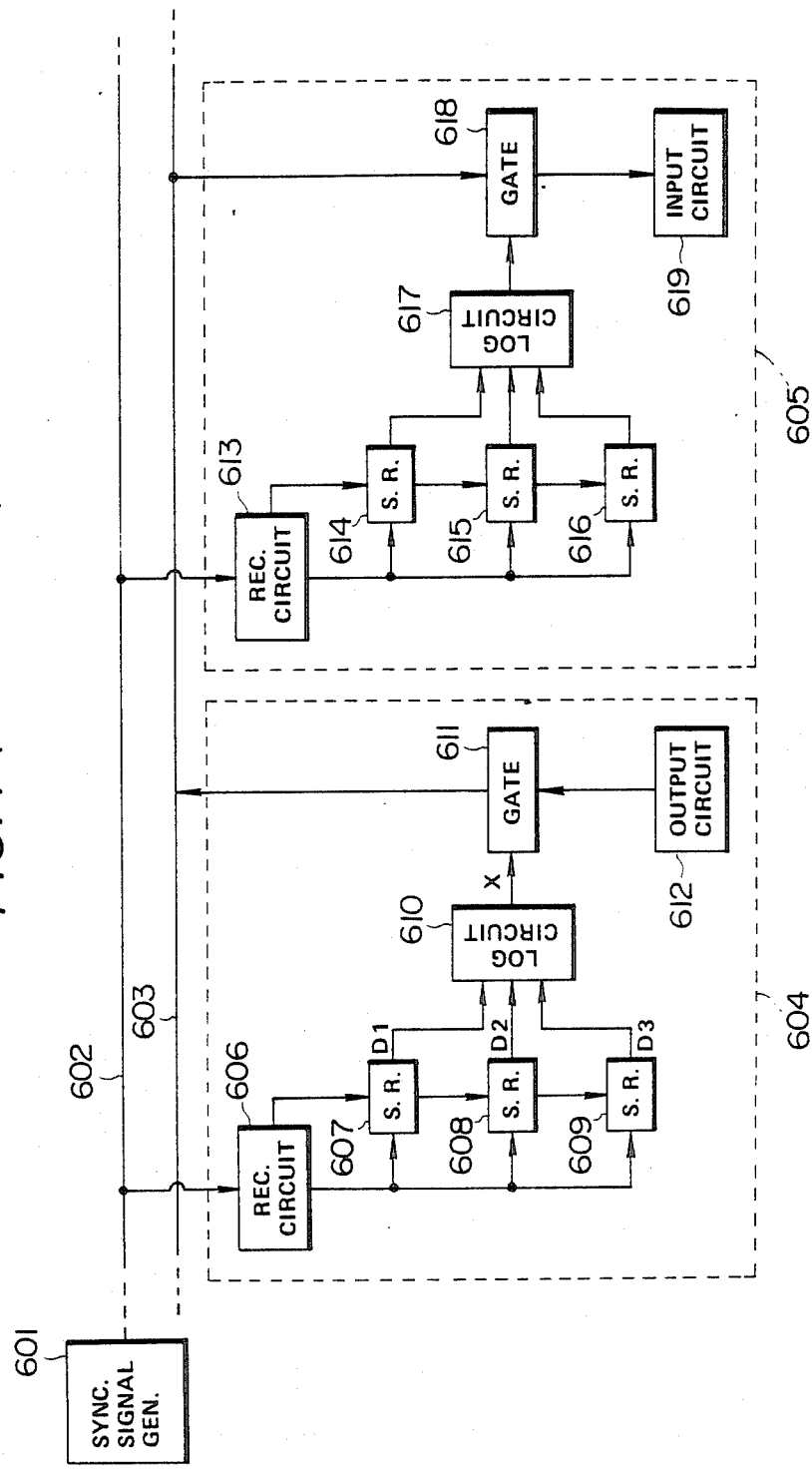
FIG. 1 is a circuit block diagram of a conventional two-wire type network system disclosed in Japanese Patent Application Examined Open No. Sho 52-13,367.
Figure 4A:
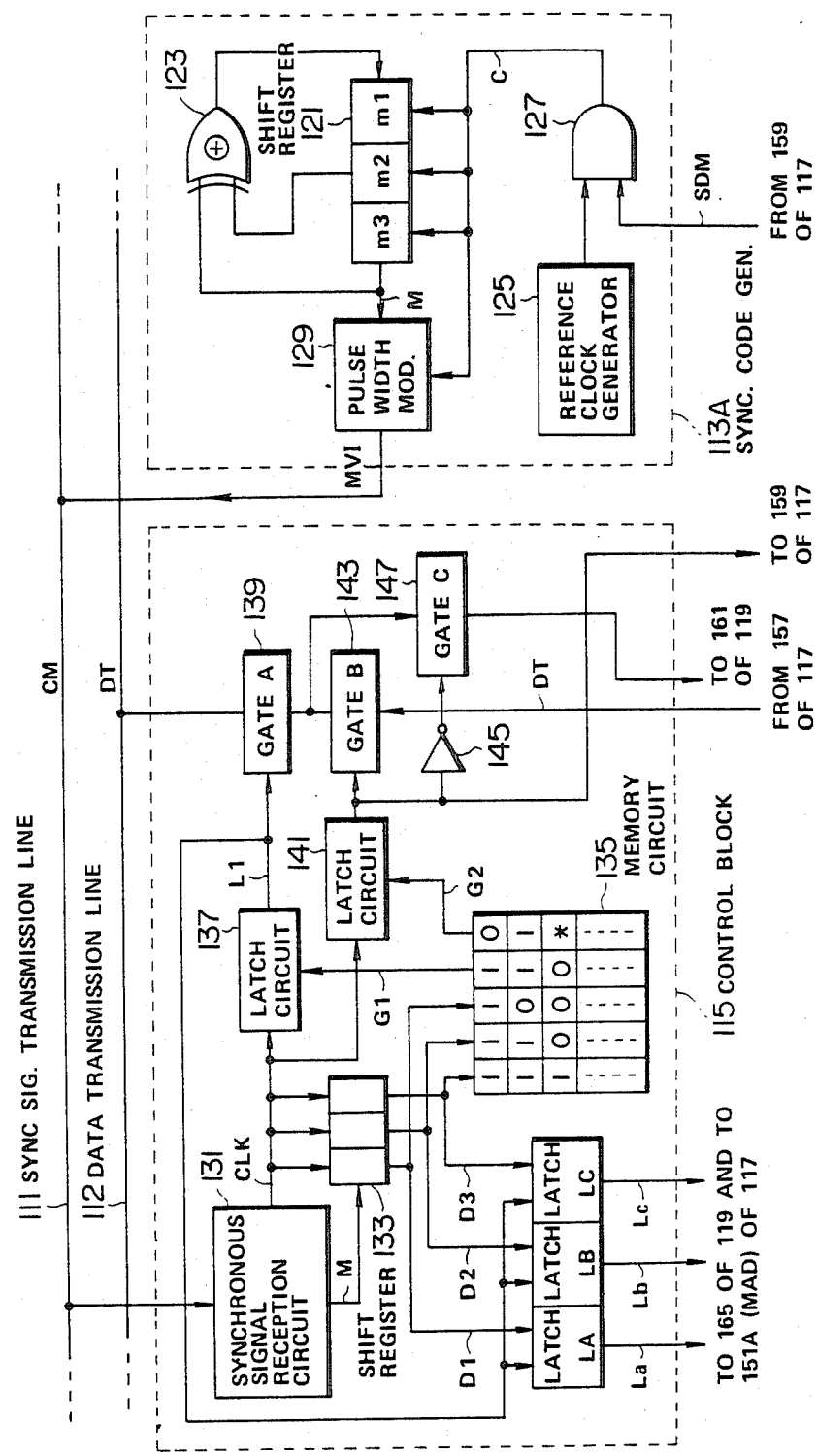
FIGS. 4(a) and 4(b) are integrally a circuit block diagram of constructions of one of the plurality of stations and synchronous code generator in a first preferred embodiment.
Figure 4B:
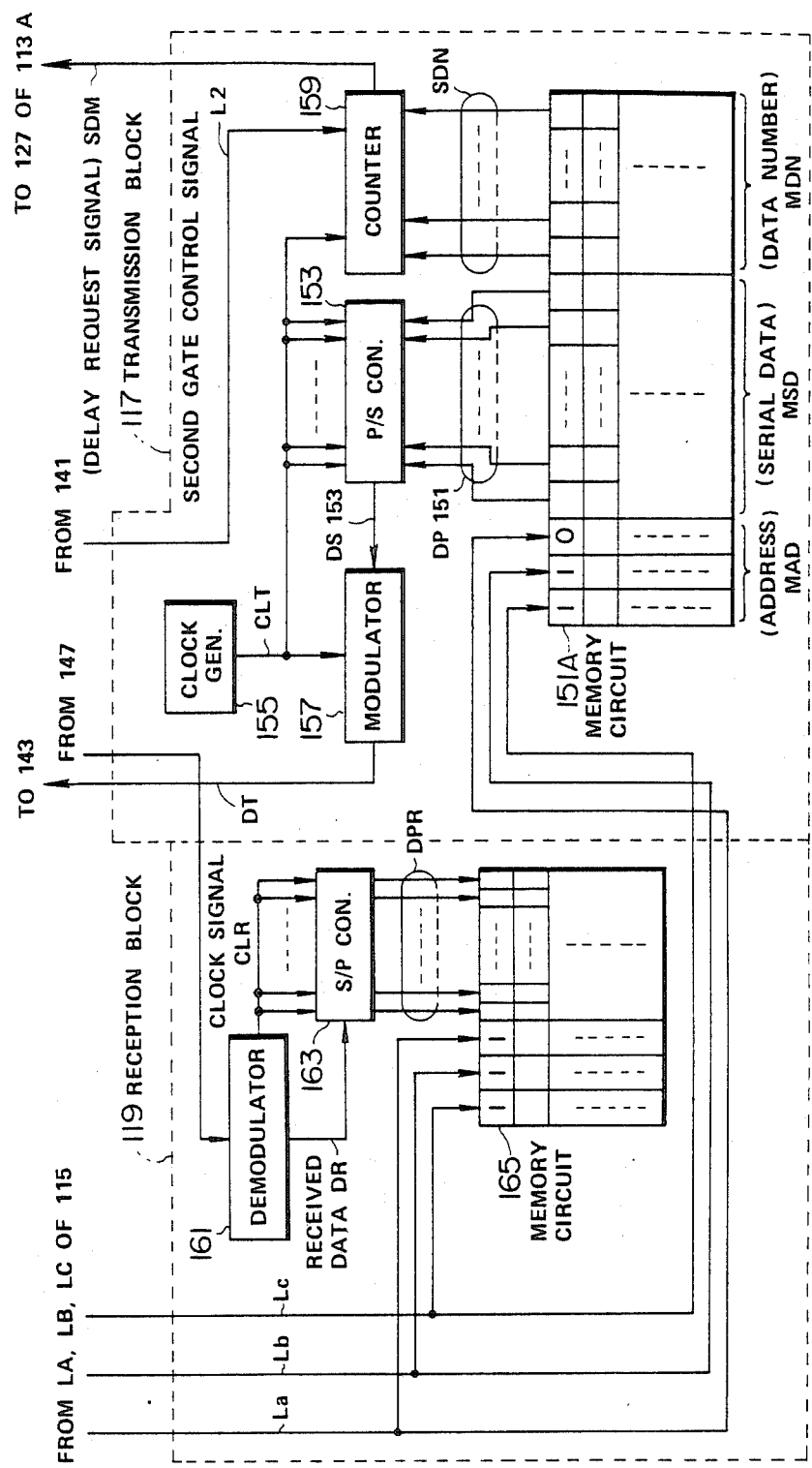

FIGS. 4(a) and 4(b) show integrally a first preferred embodiment of the present invention.

One of a plurality of stations constituting the network system according to the present invention is shown in FIGS. 4(a) and 4(b). As shown in FIGS. 4(a) and 4(b), one such station is connected to a synchronous signal transmission line 111 and a separate data transmission line 112. It should be noted that each of the other stations has the same construction as the station shown in FIGS. 4(a) and 4(b).

A synchronous code generator 113A is connected to the synchronous signal transmission line 111 for providing a transmission control over the mutual data transfers between the plurality of associated stations.

The synchronous code generator 113A issues a command (addressing) to a station which eyesauges data with another station and performs synchronizations for the data transmission and reception between the associated stations.

It should be noted that the synchronous code generator 113A is connected to the synchronous signal transmission line 111 independently of the plurality of stations as shown in FIGS. 4(a) and 4(b).

FIG. 5 shows signal timing charts for signals outputted from each circuit of the synchronous code generator 113A.

It should be noted that output signals of second stage m2 and third stage m3 of a shift register 121 are sent to two input terminals of an Exclusive OR gate 123 and an output signal of the Exclusive OR gate 123 is, in turn, inputted to an input terminal of the first stage m1 of the shift register 121. In addition, an AND gate 127 receives a reference clock signal C from a reference clock generator 125. The AND gate 127 takes a logical AND between a delay request signal SDM from a transmission block 117 to be described later and reference clock signal C. The ANDed output signal is a control clock signal CV1 shown in FIG. 4(a) commonly supplied to each stage (clock terminal) of the above-described shift register 121. In this way, the M-series code generated by means of the combination of the shift register 121 and Exclusive OR gate 123 is a three-order M-series code which follows a polynominal expression (m3βm2) derived from the Exclusive OR taken between output signals of the third stage m3 and second stage m2 of the shift register 121.

The three-order M series code signal M (refer to (b) of FIG. 5) derived from the output signal of the third stage m3 of the shift register 121 is then sent to a pulsewidth modulator 129. In addition, the reference clock signal C is also sent to the pulsewidth modulator 129. The pulsewidth modulator 129 outputs a signal whose pulsewidth is varied according to a logic state of the M-series code signal M in synchronization with a time at which the reference clock signal C having a constant period $t_c$ rises. That is to say, a pulse having a narrower pulsewidth (retention time $t_L$) is outputted when the M-series code signal M is at a low logic level ("L") and a pulse having wider pulsewidth (retention time $t_H$) is outputted when the M series code signal M is at a high logic level ("H").

The synchronous signal of the M-series code CM shown in (c) of FIG. 5 is thus produced from the pulsewidth modulator 129.

It is well known that the M-series code is used as a synchronous signal such as described above.

In general, the maximum period T of the series code achievable with n stages of the shift register and a logic element can be expressed as follows:

$$T = 2^n - 1 \qquad (1)$$

Therefore, the code status by the same combination takes a period T expressed by the above equation (1). During this period T, the code status of other than the same combination is not generated.

In a case when the synchronous signal is provided by using a predetermined number of the stages of the shift register, the number of communication channels can be maximized so that the transmission efficiency can be improved if the M-series code is utilized for the synchronous signal.

In this way, the M-series code is commonly used for a synchronous signal of data communications.

In the synchronous code generator 113A of this embodiment shown in FIG. 4(a), the number of stages of the shift register 121 is three. A normal period $T_{CM}$ of the M-series code synchronous signal CM in a case when there is no delay due to the delay request signal SDM is calculated as follows:

$$T_{CM} = t_c \times (2^3 - 1) \tag{2}$$

In addition, the code combination status is 7 cases ($=2^3-1$) as also appreciated from FIG. 3.

The construction of one station other than the synchronous code generator 113A is shown in FIGS. 4(a) and 4(b).

The station, as shown in FIGS. 4(a) and 4(b), comprises a control block 115 for carrying out commands of transmission and reception of a serial data string in the station on the basis of synchronization and addressing by means of a synchronous signal MV1 derived from the M-series code synchronous signal CM which is delayed in response to the delay request signal SDM derived from a transmission block 117.

The station further comprises a transmission block 117 which transmits the serial data string stored therewithin in a parallel state to the signal transmission line 111 in response to a command issued by the control block 115. In addition, the station further comprises a reception block 119 connectable to the data transmission line 112 in response to a command issued by the control block 116.

In details, the control block 115 comprises a synchronous signal reception circuit 131 which receives the synchronous signal MV1 (i.e., which comprises essentially the signal denoted by CM (refer to (c) of FIG. 5), separates it into a clock signal CLK similar to that shown in (a) of FIG. 5 and an M-series code signal M shown in (b) of FIG. 5, and sends them to corresponding input terminals of three stages of a shift register 133.

Three output 1s D1, D2, and D3 of the shift register 133 are sent to a memory circuit 135 provided within the control block 115 as an address data. Addresses of the memory circuit 135 are allocated in a form of combination patterns of "H" and "L" appearing during one period $T_{CM}$ of the M-series code. Data G1 and G2 for transmission and reception control are set and stored in the corresponding addresses, respectively. The memory circuit 135 is, for example, a Read-Only Memory (ROM) in which data G1 and G2 as shown in FIG. 4(a) are written in their corresponding addresses.

The control block 115 further comprises a latch circuit 137 which latches the first control data G1 sent from the memory circuit 135 in synchronization with the clock signal CLK sent from the above-described synchronous signal reception circuit 131.

The latch circuit 137 for example, comprises a D type flip-flop circuit. It is noted that a first gate control signal L1 provided as an output signal (Q) of the latch circuit 137 is, then, sent to a gate A139 and three latch circuits LA, LB, and LC.

Another latch circuit 141 latches a second control data signal G2 from the memory circuit 135 in synchronization with the clock signal CLK. The latch circuit 141 comprises a D type flip-flop circuit. The second gate control signal L2, an output of the latch circuit 141, is sent to a gate B 143 and to a gate C 147 via an inverter 145.

The transmission block 117 comprises a memory circuit 151A which stores data each constituted by a plurality of bits. The memory circuit 151A, for example, comprises a backed-up RAM. It should be noted that the memory circuit 151A comprises functionally an address area MAD, serial data memory area MSD in which data to be transmitted is read, and data number memory area MDN in which the number of stored data is stored.

A parallel data DP151 outputted from the memory circuit 151A is converted to a serial data by means of a parallel-to-serial converter 153 (P/S CON.) A clock generator 155 is provided for generating and outputting a clock signal CLT having a predetermined period ($T_{CLT}$). In addition, a modulator 157 is provided for modulating a pulsewidth of the clock signal CLT from the clock generator 155 in accordance with a logic level ("1" and "0" correspond to a high "H" level and low "L" level the serial data DS153 from the P/S converter 153 to produce a serial data string signal DT.

The clock signal CLT generated from the clock generator 155 is used to transmit each bit of the serial data string within a time slot, each bit thereof being synchronized with the clock signal CLT. Therefore, a predetermined period $T_{CLT}$ of the clock signal CLT is relatively short as compared with a period $t_c$ of the reference clock signal C which prescribes the time slot. The address area MAD of the memory circuit 151A stores three latch output signals La, Lb, and Lc derived by latching the output signals D1, D2, and D3 of the shift registers Z3 from the three latch circuits LA, LB, and LC provided within the control block 115 as an address data. When such address data is received, the serial data stored in the corresponding address is outputted.

The memory circuit 151A further includes another memory area MDN corresponding to the address memory area MAD in which the number of data is stored. A total number of bits of each serial data (it is noted that the form in the memory area MSD is a bit-parallel form) stored in a certain address is stored in the corresponding memory area MDN. The memory circuit 151A includes means for counting the number of bits stored in the serial data memory area MSD.

In addition, as shown in FIG. 4(b), the transmission block 117 includes a subtraction counter 159 a counting start of which is controlled by the second gate control signal L2 outputted from the latch circuit 141 of the control block 115.

The subtraction counter 159, at first, holds a bit-parallel data signal SDN fetched from the data number memory area MDN in the memory circuit 151A in synchronization with a time at which the second gate control signal L2 rises. Thereafter, the subtraction counter 159 counts decrementally the bit-parallel data signal SDN in synchronization with the clock signal CLT generated in the clock generator 155. The subtraction counter 159 further outputs a bit "1" when the count and hold value is zero and a bit "0" when the count and hold value is not zero, respectively.

The transmission block 117, in this way, outputs such a bit signal according to a count state of the subtraction counter 159 as a delay request signal SDM. The delay request signal SDM is sent to the above-described AND gate 127 provided within the synchronous code generator 113A for controlling the supply of the reference clock signal C to the pulsewidth modulator 129 and shift register 121.

On the other hand, the reception block 119, as shown in FIG. 4(b), comprises: (a) a demodulator 161 which demodulates the received data fetched via a gate C 147 to separate the data into clock signal CLR and serial data signal DR; b) a serial-to-parallel converter (S/P con.) 163 which converts the demodulated serial data DR into a parallel data signal DPR (hereinafter referred to as S/P converter); and (c) a memory circuit 165 (e.g., RAM) which stores the parallel-converted data signal DPR outputted from the S/P converter 163.

The clock signal CLR outputted after demodulation by means of the demodulator 161 is used to shift each bit of the serial data string DR sent to the S/P converter 163 within the time slot. Hence, a period $T_{CLR}$ of the clock signal CLR is also shorter than the period $t_c$ of the reference clock signal C in the synchronous code generator 113A which prescribes the time slot. Since the clock signal CLR is derived from the received serial data string, the period $T_{CLR}$ is the same as that $T_{CLT}$ of the clock signal CLT in the transmission block 117.

The memory circuit 165 inputs the output signals La, Lb, and Lc of the three latch circuits LA, LB, and LC as the address data and stores data sent from the S/P converter 163 into a designated address.

It should be noted that the memory circuits 151A and 165 in the transmission block 117 and in the reception block 119 are connected, for example, to a microcomputer (not shown). The transmission data is stored in the memory circuit 151A according to a state of a controlled load and the controlled load is controlled on the basis of data read from the memory circuit 165.

The gate A 139 in the control block 115 opens in response to the bit level of "1" of the first control data signal G1 so that either the transmission block 117 or reception block 119 is connected to the data transmission line 112. Which of the blocks 117 and 119 is connected thereto depends on a logic condition of the second control data signal G2 from the memory circuit 135. If the transmission block 117 is connected to the data transmission line 112, data transmission to one of the other stations is enabled. If the reception block 119 is connected to the data transmission line 112, the reception from one of the other stations is enabled.

Next, an operation of the first preferred embodiment will be described below.

In the network system constructed as described above, one of the plurality of stations constituting the network system has the memory circuit 135 in which control data G1 and G2 are stored for each address as exemplified in FIG. 4(a) and the other memory circuits 151A and 165 in which memory locations for data reception and transmission are provided for the respective addresses shown in FIG. 4(b).

Suppose now that the synchronous signal MV1 shown in (b) of FIG. 6 is sent from the synchronous code generator 113A to each station and the output signal levels (D3 through D1) of the shift register 133 shown in FIG. 4(a) are (1, 1, 1) at a time t1 shown in (b) of FIG. 6.

Since the whole output signal levels D3 through D1 of the shift register 133 indicate (1, 1, 1), the first control data signal G1 of the memory circuit 135 turns to a "1" after expiration of a delay time ta, while the second control data signal G2 remaining at a "0". The delay time ta is a time required for demodulation of the synchronous signal CM in the synchronous signal reception circuit 131 of the control block 115.

The clock signal CLK is sent to the latch circuits 137 and 141 at a time t2. The time difference between the times t1 and t2 corresponds to a period of the synchronous signal MV1. At the time t2, both control data signals G1 and G2 are latched by means of the latch circuits 137, 141. A first gate control signal L1, the output signal of the latch circuit 137 indicates "1" and second gate control signal L2, the output signal of the latch circuit 131, indicates "0".

At the same time, the first gate control signal L1 outputted from the latch circuit 137 is sent to three latch circuits LA, LB, and LC so that the latch circuits LA, LB, and LC latch respective output signals D3, D2, and D1 indicated by (1, 1, 1) of the three stages of the shift register 133. The latch output signals Lc, Lb, and La are sent in parallel to the memory circuits 151A and 165 as their address data.

Upon completion of the above operation, the whole output signals D3 through D1 of the shift register 133 after the delay time ta indicate (1, 1, 0) so that both control data signals G1 and G2 outputted from the memory circuit 135 indicate "1".

Hence, the gate A 139 is open when the first gate control signal L1 outputted from the latch circuit 137 turns to a "1" and the gate C 147 is open when the second gate control signal L2 outputted from the latch circuit 141 indicates "0". Consequently, the reception block 119 is enabled to receive the data. The serial data string signal DT constituted by the plurality of serial bits is received via the gates A 139 and C 147 from the data transmission line 112 to the reception block 119. The serial data string signal DT is demodulated and thereafter convented into the parallel data. The parallel data is stored in the designated area in the memory circuit 165 as the received data.

At this time, the memory circuit 165 stores (1, 1, 1) as the address data. The address specified by (1, 1, 1) stores the received data (, e.g., serial data of (1, 1, 0, 1) as shown in (g) of FIG. 6).

At a time t3 after the expiration of one period of the synchronous signal MV1, both control data signals G1 and G2 outputted from the memory circuit 135 are latched by the latch circuits 137 and 141. Since the first control data signal G1 indicates "1" and second control data signal G2 indicates "1", the first gate control signal L1, the output signal of the latch circuit 137, indicates "1" and the second gate control signal L2 outputted from the latch circuit 141 indicates "1". Therefore, the gate A 139 is open, the gate B143 is open, the gate C 147 is closed so that the transmission block 117 is, in turn, enabled to transmit the stored data.

In addition, the three latch circuits LA, LB, and LC latch simumtaneously the output signals (1, 1, 0) derived from the shift register 133 at the time t3.

The latched signals (1, 1, 0), i.e., output signals La, Lb, and Lc are sent to the memory circuits 151A and 165.

The output signals D3 through D1 of the respective stages of the shift register 133 are shifted one stage after the expiration of the delay time ta started from the time t3. The output signal logic states are (1, 0, 0) and accordingly the output signals from the memory circuit 135 are changed.

Hence, until a time corresponding to one period of the synchronous signal MV1 has passed from the time t3, the serial data constituted by the plurality of bits are sent to the data transmission line 113 from the transmission block 117 via the gates A 139 and B 143. At this time, the transmission data stored within the memory area corresponding to the received address data (1, 1, 0) are sent to the transmission line 113 from the memory circuit 151A.

Suppose then that the data stored in the address (1, 1, 0) in the memory circuit 151A of the transmission block 117 is a parallel data of (1, 0, 0, 1).

When the address is specified as (1, 1, 0), the data (1, 0, 0, 1) is read so that the parallel data signal DP151 is sent to the P/S converter 153. The P/S converter 153 converts the parallel data signal DP151 into the corresponding serial data signal DS153 in synchronization with the clock signal CLT. The serial data DS153 after the P/S conversion undergoes a pulsewidth modulation by means of the modulator 157 according to the clock signal CLT.

The data signal DT (refer to (g) of FIG. 6) of the serial data (1, 0, 0, 1) in which a wide pulsewidth representing "1" and narrow pulsewidth representing "0" are present in series with each other with respect to time is sent to the data transmission line 113 via the gates B 143 and A 149.

In the transmission mode after the time t3, the second gate control signal L2 indicates "1" which is sent from the control block 115 to the transmission block 117. At the rising edge of the control signal L2, the data on the bit length (in this embodiment 4 bits) is read which is stored in the data number memory area MDN of the memory circuit 151. In other words, the bit length signal SDN (representing "four") on the basis of the bit length data is sent to the subtraction counter 159. Numerical value ("4") representing the bit length is set in the subtraction counter 159.

The serial data is transmitted in a unit of one bit on the basis of the clock signal CLT from the clock generator 155. The subtraction counter 159 counts decrementally by one the data length signal SDN whenever the clock signal CT is received. The output signal of the subtraction counter 159 indicates "0" until the completion of transmission of the four-bit serial data and indicates "1" upon completion of transmission of the four-bit serial data.

Hence, the logic state of the delay request signal SDM generated from the transmission block 117 indicates "0" during transmission of the serial data and indicates "1" after end of the serial data transmission.

The AND gate 127 of the synchronous signal generator 113A which receives the delay request signal SDM controls the passage of the reference clock signal C according to the logic state of the delay request signal SDM to the pulsewidth modulator 129 and shift register 121.

During transmission of the serial data, the pulsewidth modulator 129 and shift register 121 cannot receive (inhibit) the reference clock signal C (Upon completion of transmission, the supply of the reference clock signal C is resumed). In this way, the control clock signal CV1 passed through the AND gate 127 which receives the delay request signal SDM is used, in this embodiment, as the synchronous code generation.

Therefore, the supply of the synchronous signal MV1 to the synchronous signal transmission line 111 is inhibited until the transmission of the serial data is completed. If the reference clock signal C is generated during the transmission of the serial data, the generation of the synchronous signal MV1 is delayed until completion of the transmission.

Consequently, the transmission time slot is varied and extended according to the length of serial data string. The data transmission can be carried out without hinderance by the clock of the synchronous code.

It should be noted a duration can be extended for which the delay request signal SDM is at a "0", the duration being started at a time of the end of transmission of serial data and continuing for a predetermined time. In this case, a time at which the inhibit of passage of the reference clock signal C is released at the AND gate 127 of the synchronous code generator 113A is delayed by a predetermined time.

As described above, in one of the stations shown in FIGS. 4(a) and 4(b), the data receipt is made when the address indicates (1, 1, 1) and the data transmission is made when the address indicates (1, 1, 0). On the other hand, if in one of the other stations, each memory circuit 135, 151A, 165 is set such that the data transmission is made when the address indicates (1, 1, 1) and the data reception is made when the address indicates (1, 1, 0), a synchronization can be established between these stations (, i.e., the station shown in FIGS. 4(a) and 4(b) and above-described one of the other stations) and mutual transmission and reception of data can be achieved between those stations.

If in the station shown in FIGS. 4(a) and 4(b), the data is set in the memory circuit 131 in such a way that, e.g., if the address is (0, 0, 1), the data reception is carried out but if the address is (0, 1, 0), the data transmission is carried out, and if in one of the other stations, the data is set in such a way that if the address is (0, 0, 1), the data transmission is carried out but if the address is (0, 1, 0), the data reception is carried out, the data transmission/reception is made between those stations. In this way, the station shown in FIGS. 4(a) and 4(b) can transmit and receive a predetermined data to and from two of the other stations separately without collision of the predetermined data.

Hence, if the mutual data transmission and reception are set with the addresses common to the stations between which the data transfer is made, it is possible to make addressing with the synchronization taken by means of the synchronous signal MV1.

Furthermore, one station can transmit and receive a plurality of different data to and from a plurality of satations.

Figure 7A:
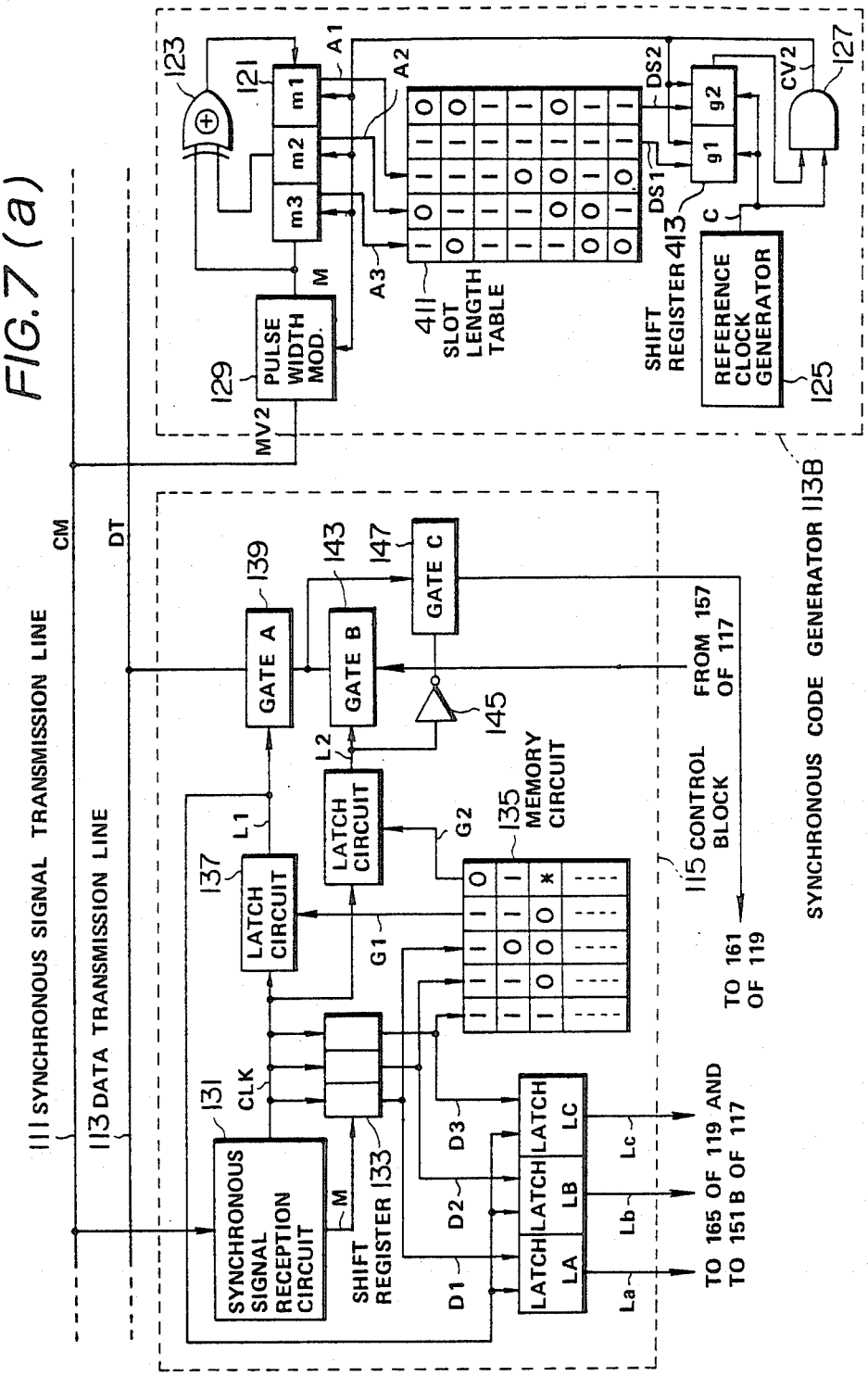
FIGS. 7(a) and 7(b) are integrally a circuit block diagram of one of the stations and synchronous code generator of a second preferred embodiment according to the present invention.
Figure 7B:
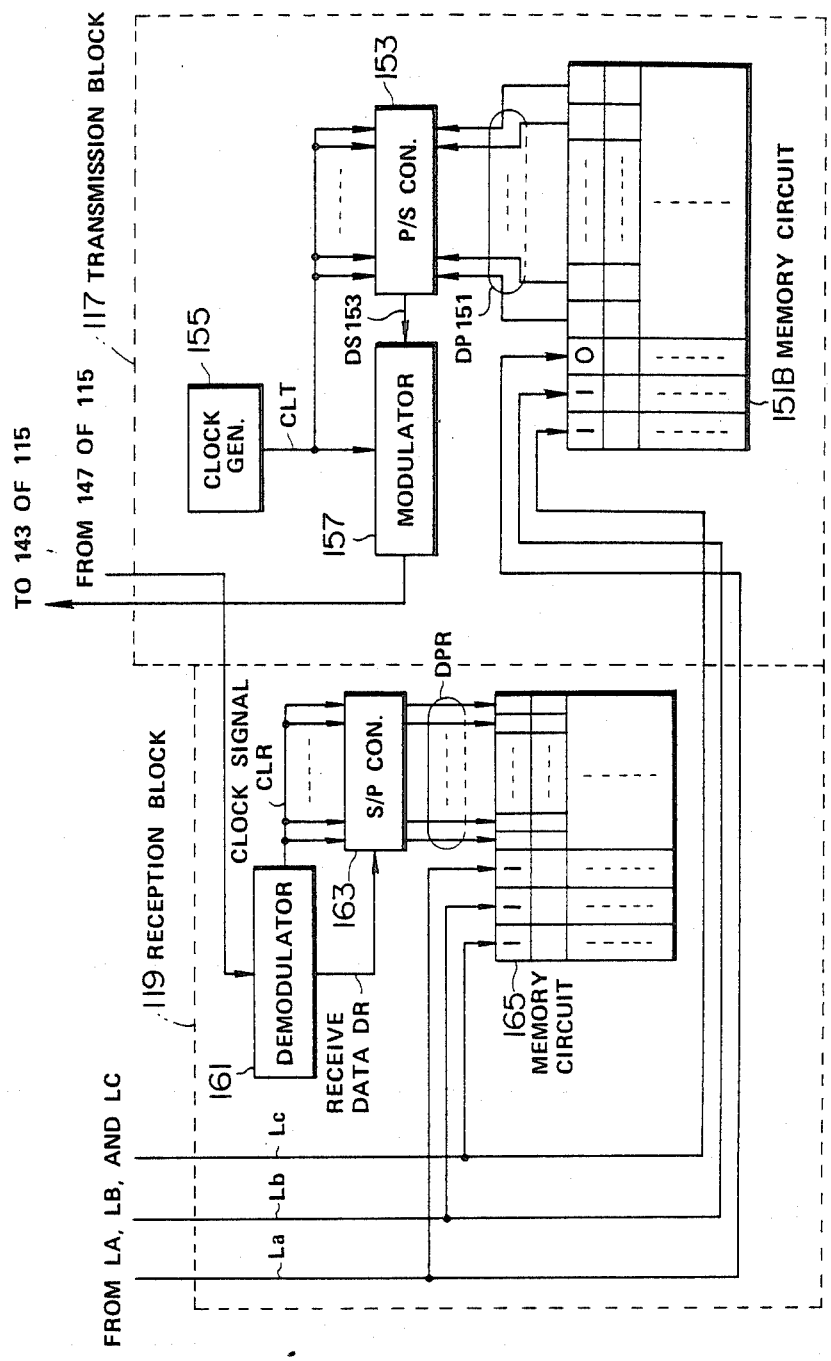

FIGS. 7(a) and 7(b), the individual construction of transmission block 17 and synchronous code generator 113B are different from those shown in FIGS. 4(a) and 4(b).

In details, the transmission block 117 eliminates the data number memory area MDN storing the data on bit length in the memory circuit 151B and uses no substraction counter.

The synchronous code generator 113B, in addition, is provided with a slot length table (comprising, e.g., ROM) 411 and additional two stages (g1, g2) of the shift register 413.

In addition, the parallel output signals A3 through A1 of the three stages m3 through m1 in the shift register 121 are used as the address signals of slot length table 411. Two output signals DS1 and DS2 of the slot length table 411 are sent to first stage g1 and second stage g2 of the shift register 413.

The AND gate 127 receives the output signal of the second stage g2 of the shift register 413 and reference clock signal C from the reference clock generator 125.

The control clock signal CV2, i.e., logical product of the AND gate 127 is sent to each stage of the shift registers 121 and to the pulsewidth modulator 129. The shift register 413 latches the output signals DS1 and DS2 of the slot length table 411 on the rising edge of the control clock signal CV2.

The shift register 413 shifts the latched output signals DS1 and DS2 whenever the reference clock signal C from the reference clock generator 125 rises.

Suppose now that each data is stored in each address as depicted in FIG. 7(a).

Figure 8:
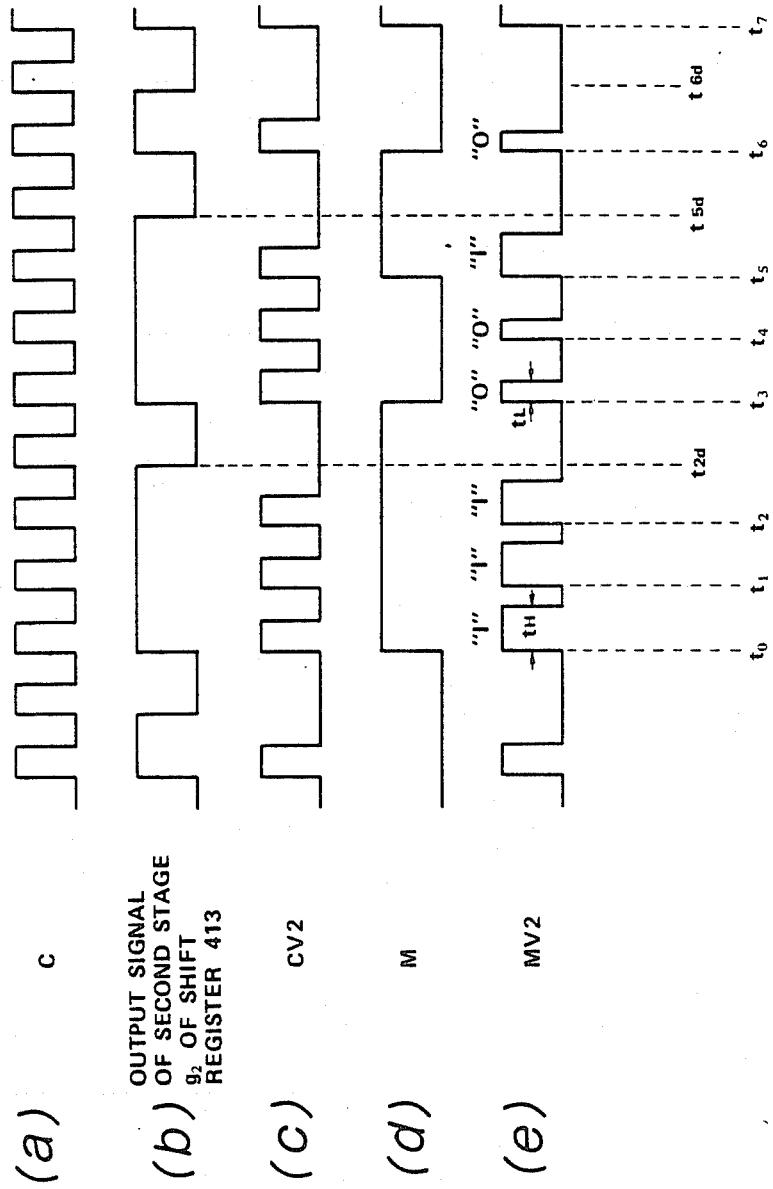
FIGS. 8(a) through 8(e) are signal timing charts for explaining an operation of the second preferred embodiment shown in FIGS. 7(a) and 7(b) and FIG. 9 shows an arrangement of an entire system, including a plurality of stations.
Figure 9:
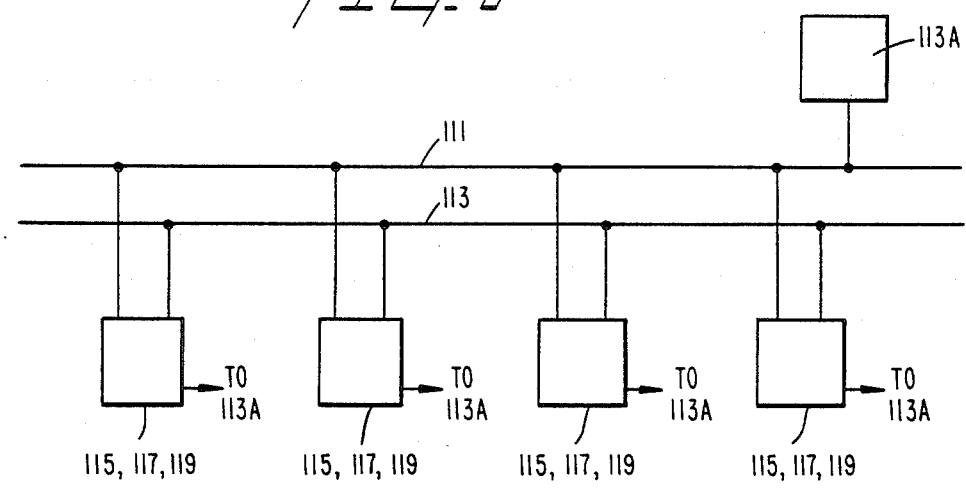

FIG. 8 shows a signal timing chart of each output signal of the representative circuits in the synchronous code generator 113B of FIG. 7(a).

Suppose now that the logic states A3 through A1 in the three stages m3 through m1 of the shift register 121 immediately before the time t2 indicate (1, 1, 0). At this time, the M-series code signal M is at a "1" and the output signal of the Exclusive OR gate 123 is at a "0".

Both output logic states of the first stage g1 and second stage g2 of the shift register 413 are "1s" since both output signal levels DS1 and DS2 outputted from the slot length table 411 are "1s". Due to the shift operation by means of the reference clock signal C, the output logic state of the second stage g2 thereof remains at a "1" after the time t2.

At the time t2, the control clock signal CV2 derived from the AND gate 127 is sent to the shift register 121 so that the respective logic states A3 through A1 of the shift register 121 indicate (1, 0, 0). Since the M-series code signal M remains at a "1", the logic states of the output signals DS1 and DS2 of the slot length table 411 are "1" and "0" which is then held in the shift register 413.

Although the subsequent reference clock signal C is generated at the time t2d, the clock pulse of the reference clock signal C is disabled to pass through the AND gate 127. The generation of M-series code is delayed without shift in the shift register 121.

The second stage g2 of the shift register 413 is turned to a "1" due to the shift operation thereof at the time t3 at which the subsequent reference clock signal C is generated. Therefore, the clock pulse from the reference clock generator 125 is enabled to pass through the AND gate 127 and appears as the control clock signal CV2.

The shift operation of the shift register 121 is again started.

Thereafter, the output signals A3 through A1 of the shift registers 121 indicate (1, 0, 1) at a time t5. The data signal DS1 outputted from the slot length table 411 is "1", the data signal DS2 outputted from the slot length table 413 is "0", and these data signals DS1 and DS2 are sent and held into the respective stages of shift register 413.

Since the second stage g2 thereof indicates "0", one clock pulse is not enabled to pass through the AND gate 127 if the clock pulse appears on the reference clock signal C at a time t5d. In the same way, one clock pulse is not enabled to pass through the AND gate if the clock pulse appears on the reference clock signal C at a time t6d as shown in FIG. 8.

In this way. A time space appears in which no clock pulse is present in the control clock signal CV2 according to the set data DS1, DS2 in the slot length table 411 (in this embodiment, the times t2d, t5d, and t6d). Since the generation of the synchronous code is not continued in this case, the synchronous signal is thus delayed so that the time slot is accordingly extended.

In this way, the time slot can be extended by a desired length and the generation of the code string is delayed so that the time slot can correspond to the length of the serial data string to be transmitted.

In the second embodiment, the time slot lengths corresponding to the synchronous addresses (1, 0, 0), (1, 0, 1), and (0, 1, 1) are extended. Since the third-order M series code system is used as the synchronous code, a delay flag may be set to a memory area of the slot length table which corresponds to an address third shifted rearward in the synchronization address sequence in the slot length table since the third-order M-series is used as the synchronous code. If an N-order M-series code is used, the address may be shifted rearward by N.

Furthermore, although in this embodiment, the time slot length for the predetermined code string address is twice longer than that for the other code string address, the time slot length for the predetermined code string address can be a multiplication of an integer for the other code string address if the number of stages of the shift register 413 and the storage data length of the slot length table 411 are increased.

It should be noted that the shift register 413 may be replaced with a counter.

If a multiplicant to extend the time slot is made larger, it is effective since the bits of the storage data length in the slot length table 411 are made smaller if the counter is used.

In addition, in the same way as described with reference to FIGS. 4(a) and 4(b), the address in each station can be arbitrarily set in the embodiment shown in FIGS. 7(a) and 7(b) so that the mutual data transfer between the stations can be made.

If in the network system of both embodiments shown in FIGS. 4(a), 4(b), 7(a) and 7(b), each station can function as only data receiving unit or only data transmitting unit if either the data reception block 119 or data transmission block 117 is eliminated.

Furthermore, although the M-series code is used for the synchronous code, any other code such as L series code may be used. However, it may be practically difficult to use other time series code since such a combination of shift register and logic element cannot achieve the other time series code.

As described hereinabove, if the generation of information bit for a synchronous signal is variably delayed so as to correspond to the length of the serial data string to be transmitted and the time slot is extended, the transmission efficiency in the network system can be improved and an inexpensive network can be achieved.

It will clearly be understood by those skilled in the art that the foregoing description is made in terms of preferred embodiments and various changes may be made without departing from the scope and spirit of the present invention, which is to be defined by the appended claims.

We claim:

1. A network system including a data transmission line through which a serial data is transmitted, a synchronous signals transmission line through which a synchronous signal for controlling a transfer of the serial data is transmitted, and a plurality of data stations connected to both data transmission line and synchronous signal transmission line, each one of the data stations transferring the serial data to any of the other data stations in accordance with the synchronous signal, comprising:

(a) first means for generating and outputting the synchronous signal to the synchronous signal transmission line, the synchronous signals having information bits of a constant period for selecting any of the data stations between which the serial data is transferred via the data transmission line and with which the transfer of the serial data is synchronized;

(b) second means for cyclically generating said information bits of the synchronous signal;

(c) third means for operatively inhibiting the transmission of said information bits to the synchronous signal transmission line; and (d) fourth means responsive to the selection of any of the stations to transmit the serial data to the data transmission line by means of said information bits for actuating said third means to inhibit the transmission of said information bits to the synchronous signal transmission line over a period which is varied according to a length of the serial data transmitted to the data transmission line.

2. The network system according to claim 1, wherein said fourth means sends a first signal which indicates that the serial data is being transmitted to the other designated station from the selected data station via the data transmission line to said third means until completion of the transmission of the serial data.

3. The network system according to claim 2, wherein said third means comprises an AND gate and a clock pulse generator, one input terminal of said AND gate receiving a clock pulse signal having a predetermined period from said clock pulse generator and the other input terminal thereof receiving the first signal from said fourth means, for passing the clock pulse signal therethrough to said second means when the first signal is not received.

4. The network system according to claim 3, wherein said second means comprises:

(a) a shift register having a predetermined number of stages which shifts a logic signal of a previous stage thereof in synchronization with the clock pulse signal from said clock pulse generator via said AND gate;

(b) a logic element connected to said shift register for generating an M-series code having a period expressed as $T_{CM} = tc \times (2^n - 1)$ together with said shift register, wherein tc denotes the predetermined period of the clock pulse and n denotes the predetermined number of stages of said shift register.

5. The network system according to claim 4, wherein the predetermined number of stages of said shift register is three and said logic element comprises an Exclusive OR gate, one input terminal thereof being connected to an output terminal of a third stage of said shift register, the other input terminal thereof being connected to an output terminal of a second stage of said shift register, and output terminal thereof being connected to an input terminal of a first stage of said shift register, so that a third order M-series code signal is generated.

6. The network system according to claim 4, wherein said first means comprises a modulator connected to the synchronous signal transmission line which modulates the M-series code signal generated by said shift register and logic element in synchronization with the clock pulse signal sent from the clock pulse generator via said AND gate so that the synchronous signal having said information bits of the constant period corresponding to the period of the M-series code is sent to the synchronous signal transmission line.

7. The network system according to claim 3, wherein fourth means comprises:

(a) fifth means for counting and storing the number of bits constituting the serial data to be transmitted to the data transmission line; and (b) sixth means for holding the stored number of bits in said fifth means when the synchronous signal from said first means selects the data station having said fourth means to which the serial data is transmitted, counting decrementally the stored number of bits in synchronization with a timing at which each bit constituting the serial data is transmitted to the data transmission line, and outputting the first signal to said AND gate until the decremental count thereof result gives zero.

8. The network system according to claim 7, wherein a period from the timing at which one bit constituting the serial data is transmitted to the timing at which the subsequent bit is transmitted is set to be shorter than the predetermined period of said clock pulse generator of said third means.

9. The network system according to claim 1, wherein said fourth means comprises:

(a) fifth means for storing inhibit information on a predetermined duration for each data station on a basis of which said third means inhibits the transmission of said information bits to the synchronous signal line transmission; and (b) sixth means for retrieving the inhibit information from said fifth means and actuating said third means to inhibit the transmission of said information bits to the synchronous signal transmission line according to the predetermined duration stored in said fifth means so that the serial data from the data station selected by said information bits is transmitted to the data transmission line within the predetermined duration.

10. The network system according to claim 9, wherein said sixth means comprises two stages of a shift register each input terminal of which is connected to said fifth means for shifting bits constituting the predetermined inhibit information so as to extend the duration for which the transmission of said information bits to the synchronous signal transmission line is inhibited by said third means.

11. The network system according to claim 10, wherein the extension of the duration is multiplied by an integer when the length of bits constituting the predetermined inhibit information and the number of stages of the shift register are increased.

* * * * *